Oct. 2, 1962 A. N. ORMOND 3,056,892

CHAIN SWITCH

Filed Nov. 16, 1959

INVENTOR.
ALFRED N. ORMOND
BY *Elliott & Pastoriza*
ATTORNEYS.

United States Patent Office 3,056,892

Patented Oct. 2, 1962

3,056,892

CHAIN SWITCH

Alfred N. Ormond, Box 238, Inglewood, Calif.

Filed Nov. 16, 1959, Ser. No. 853,346
3 Claims. (Cl. 307—132)

This invention relates generally to electrical switching systems and more particularly to a novel high speed switching system for switching one or more channels of electrical information at an extremely rapid rate without deteriorating the signals representing the information.

Present day telemetering, communication, instrumentation, and other operations systems, usually incorporate switching arrangements which require the rapid switching of one or more channels of information with minimum deterioration of the signals themselves. High speed switching rates can be carried out electronically by the use of vaccum tubes and/or semi-conductor devices as is well known to those skilled in the art. While such elements have a very rapid switching rate, they may nevertheless be deficient in power handling capabilities, stability, and reliability. For example, when low signal levels are involved, vacuum tubes and semi-conductor devices inherently introduce noise as well as switching transients. Moreover, the impedances offered by the switching elements are sometimes so high in the conducting or "on" condition that excessive attenuation of the signal results. In the non-conducting or "off" state on the other hand, the impedances may not be sufficiently high to completely block the signal. This latter problem can thus limit the use of such switches in parallel.

Mechanical switches eliminate most of the foregoing deficiencies. Almost any desired power can be readily handled by a mechanical switch. Moreover, the make or break of mechanical contacts is precise so that when a mechanical switch is closed a substantially perfect conducting path is formed and when the switch is open substantially infinite impedance is presented. The primary disadvantage of mechanical switches, however, resides in the inertia of the moving switch contacts. In other words, the switches have a relatively slow response time.

Bearing the foregoing in mind, it is a primary object of the present invention to provide an extremely high speed switching system which employs mechanical switches arranged in such a manner as to overcome the limitation of slow response to the end that greatly improved switching systems can be provided.

More particularly, an object of the invention is to provide a mechanical switching system capable of passing a signal for a finite period of time in which the finite period may be of the order of a fraction of a microsecond notwithstanding the switching components themselves are slow acting.

Another important object of this invention is to provide a chain switch enabling the sequential provision of one or more channels of information at a common output and at an extremely rapid rate without deteriorating the quality of the signals themselves, such chain switch being capable of operation using either mechanical or electronic switching elements.

Other objects of this invention are to provide switching systems meeting the foregoing objects which are rugged, economical to manufacture, and in general provide all of the advantages of simple known types of mechanical switches without the disadvantages resulting from slow acting or relatively long response times as characterize individual switching elements.

Briefly, these and many other objects and advantages of the invention are attained by employing a pair of mechanical switches connected in series. While the invention contemplates uses of electronic switches, at the present state of the art, mechanical switches are preferable. One of the switches is normally open and the other switch is normally closed. The switches are then actuated in progression to close the normally open switch for a first period and open the normally closed switch for a second period. By overlapping the periods, both switches will be closed to complete a circuit for a finite increment of time. This increment of time is controlled only by the sequence or progression rate of operating one switch after the other and not by the response time of the switch itself. Since the actual make and break time of a high quality mechanically operated switch takes only a fraction of a micro-second whereas the response to motion may require several mille-seconds, the foregoing technique of sequentially operating two such switches in series provides a means of attaining an exceedingly rapid switching rate using relatively slow acting element.

In a particular embodiment of the invention, a plurality of series connected pairs of switches may be sequentially operated to enable rapid sampling of a plurality of individual channels at an extremely rapid rate without any deterioration of the signals.

A better understanding of the invention will be had by now referring to the accompanying drawings, in which.

Figure 1:
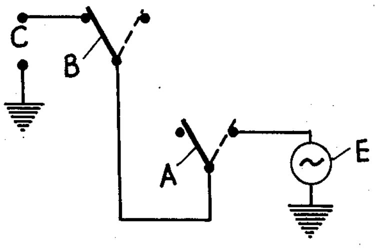
FIGURE 1 is a simple schematic electrical circuit showing the basic elements of the invention.

Referring first to FIGURE 1, there are shown a pair of switches A and B connected in series in such a manner that when both the switches A and B are closed, information from an electrical generator E will be passed through output terminal C. When one or the other of the switches A and B is open, no signal will be passed to the output terminal C. In the embodiment of FIGURE 1, the first switch A is normally open and the second series connected switch B is normally closed. If the switch A is now energized to close for a first given period and the switch B is then actuated to open for a second given period and means are provided for closing the normally open switch A prior to opening of the normally closed switch B, the first and second periods will overlap and define a finite period of time constituting a common period when both switches are closed. It is only during such common period that any signal will appear at the output terminal C.

Figure 2:
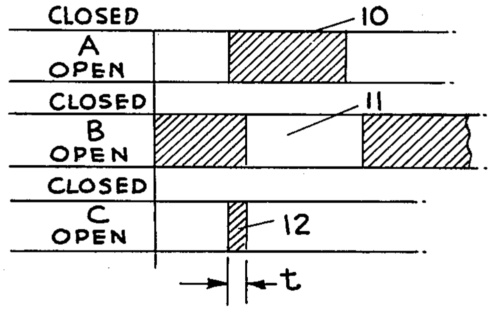
FIGURE 2 is a series of time charts useful in explaining the principles underlying the operation of the circuit of FIGURE 1; and, FIGURE 3 is a schematic diagram of a chain switch layout in accordance with the invention.

This situation is pictorially illustrated in FIGURE 2 wherein the first period during which the normally open switch A is closed is indicated by the shaded area 10 and the second period during which the normally closed switch B is open is indicated by the non-shaded area 11. The finite increment of time in which the entire circuit from E to C is closed is indicated by the shaded area 12 and designated *t*. From FIGURE 2 it will be evident that the period *t* can be made exceedingly short since this period depends only upon the sequential switching rate of the switches A and B and not on the length of time the same are closed or open. Thus while the switches A and B may be relatively slow acting, their actual make and break contact times can be of the order of micro seconds and thus the final period during which complete continuity is effected can be made extremely small.

Figure 3:
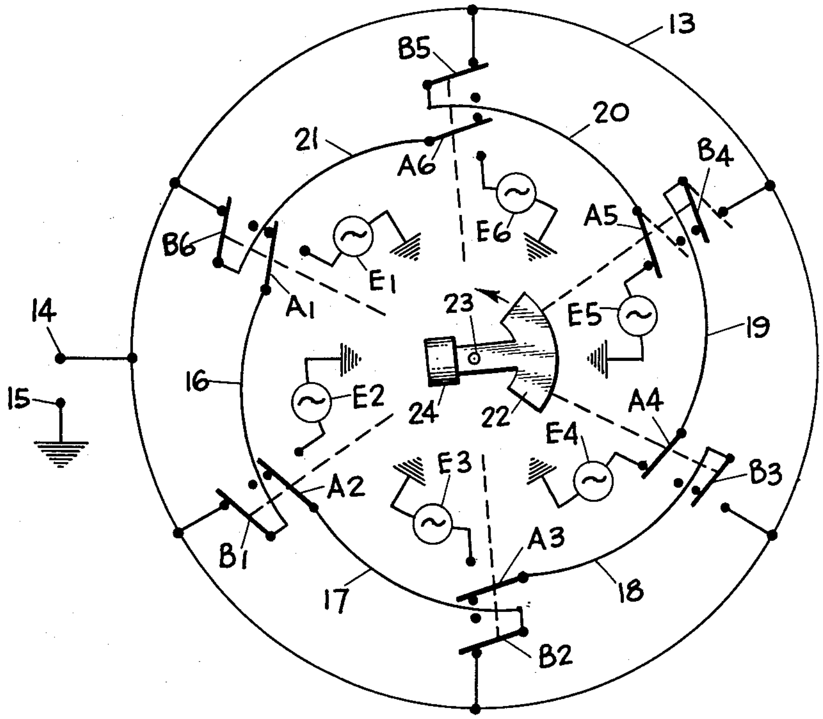

In the case of multi-channel operation, pairs of series connected normally open and normally closed switches can be employed in a chain. Referring, for example, to FIGURE 3 there is shown a plurality of normally open switches A1, A2, A3, A4, A5, and A6 preferably formed in uniformally spaced positions about a first circle. Similarly, there are provided a plurality of normally closed switches B1, B2, B3, B4, B5, and B6, also arranged about a second circle concentric with the first-mentioned circle. As shown, the inner contacts of the first circular array of normally open switches individually connect to generators E1, E2, E3, E4, E5, and E6 respectively to provide individual inputs to each of the switches. On the other hand, the outer contacts of the second circular array of normally closed switches connect to a common output line 13 provided with an output terminal 14 and ground return terminal 15.

In accordance with the embodiment chosen for illustrative purposes, the first circular array of normally open A switches are respectively connected in series with the second circular array of normally closed B switches as by means of series connectors 16, 17, 18, 19, 20, and 21. Thus the switch A1 is connected to the switch B1, the switch A2 to the switch B2, the switch A3 to the switch B3, the switch A4 to the switch B4, the switch A5 to the switch B5, and the switch A6 to the switch B6. The relative circumferential positioning of the switches is such, however, that the series connected pairs are circumferentially displaced relatively to each other by a distance equal to the circumferential distance between adjacent switches in the same circle. With this arrangement, the switch A1 is in radial alignment or in the same radial plane normal to the circles as the switch B6, the switch A2 is in the same plane as the switch B1, the switch A3 in the same plane as the switch B2, and so forth. By so disposing the switches, a common mechanical connection can be made to the switches in the same radial planes or alignments so that the same may be actuated simultaneously by a single actuating means.

As shown in FIGURE 3, such actuating means may take the form of an arcuate magnet 22 arranged to revolve about the center of the circles 23. The structure may be counter-balanced by a suitable weight 24. If the magnet is now caused to revolve in a counter-clockwise direction as shown by the arrow in FIGURE 3, and the switches in the same radial plane or in radial alignment constitute double pole relays as indicated by the dashed radial lines, the various switches in radial alignment will be actuated simultaneously and sequentially as the magnet revolves about a circular path.

Because of the relative circumferential displacement of the A switches from the B switches and the series connections as described, it will be evident that actuation of the normally open switch A1 to a closed position will simultaneously result in actuation of that normally closed switch B6 which is connected in series to the previously actuated normally open switch A6. It will also be evident that in the actuation of the switches A1 and B6, for example, the switch B6 will be opened prior to closing of the switch A1.

From the foregoing description, the operation of the chain switch layout of FIGURE 3 will be evident. Assume that the magnet 22 is revolving about the center 23 and assumes the solid line position at a given instant of time as shown in FIGURE 3. In this position, both the switches A4 and A5 are actuated to their closed positions and the normally closed switches B3 and B4 are actuated to their open positions. Under these conditions, an output signal from the generator E5 will pass through the switch arm A5, series connection 20, and switch arm B5 to the common output lead 13 and output terminal 14. However, none of the other signals from the other E generators can pass to the common output line 13 and terminal 14. This situation obtains even though the switch A4 is actuated since its series connected switch B4 is open. In other words, the arcuate extent of the magnet could result in the operation of several switches at once and yet only a single signal at a time will be passed out to the output line.

The appearance of the signal from the generator E5 on the common output line 13 and output terminal 14 will only remain for a finite increment of time determined by the length of time for the sequential or progressive movement of the magnet 22 from the solid line position shown to a position to actuate the switches A6 and B5. When the switch B5 is actuated, it will open thus removing the signal from the generator E5. The simultaneous closing of the switch A6 however will then result in the signal from the generator E6 passing through the switch arm A6, series connected lead 21, and switch arm B6 to the output line 13 and terminal 14. As the magnet 22 continues to revolve, the remaining signals from the generators E1, E2, E3, E4, and E5 will sequentially appear on the common output line 13 and output terminal 14.

It is thus seen that several channels of information may be sequentially sampled and passed to a common output line at an extremely rapid rate.

While a magnetic actuating means for controlling the sequential switching has been shown and described it will be evident that any equivalent electrical system for sequentially actuating the switches could be employed. The term "switch" as used in the appended claims is therefore meant to include electronic switches as well as mechanical.

Thus while the invention has been described with respect to one embodiment, many modifications and additions falling within its scope and spirit will readily occur to those skilled in the art. The chain switch is therefore not to be thought of as limited to the specific structure set forth merely for illustrative purposes.

What is claimed is:

1. A chain switch comprising, in combination: a plurality of normally open switches; a plurality of normally closed switches corresponding in number to said normally open switches, each normally closed switch being connected in series with a corresponding normally open switch to provide a plurality of individual switch pairs each comprising one normally open switch connected in series with one normally closed switch, said pairs forming a sequential line; individual input means respectively connected to one side of said switch pairs; a common output line connected to the other side of said switch pairs; and switch actuating means for sequentially closing said normally open switches and simultaneously, sequentially opening that normally closed switch connected in series with the previous normally open switch actuated in said sequential line, said previous actuated normally open switch being closed prior to opening of its corresponding series connected normally closed switch so that said individual inputs are sequentially and individually connected to said common output line for given time periods.

2. The subject matter of claim 1, in which said plurality of normally open switches are uniformly disposed about in a first circle and said plurality of normally closed switches are uniformly disposed about in a second concentric circle so that said sequential line takes the form of a circular path; the relative circumferential positioning of the switches in said first circle with respect to the switches in said second circle being such that each normally open switch in said first circle lies substantially in a radial plane normal to said circles including that normally closed switch in said second circle connected in series with the immediately preceding circumferentially spaced normally open switch in said first circle; said switch actuating means including an actuating member mounted for revolution about the center of said first circle to follow said circular path; and means responsive to the passing of said member and associated with corresponding switches in substantially the same radial plane, to actuate the same simultaneously and periodically as said member revolves about said center.

3. The subject matter of claim 2, in which said actuating member comprises a magnet and said means responsive to the passing of said member being responsive to the magnetic field of said magnet.

References Cited in the file of this patent

UNITED STATES PATENTS

| | | |
|---|---|---|
| 2,157,858 | Miller | May 9, 1939 |

FOREIGN PATENTS

| | | |
|---|---|---|
| 717,458 | Germany | Feb. 14, 1942 |
| 784,559 | Great Britain | Oct. 9, 1957 |